(12) United States Patent
Eslambolchi et al.

(10) Patent No.: US 7,289,729 B1
(45) Date of Patent: Oct. 30, 2007

(54) OPTOELECTRONIC MARKER FOR DETERMINING OWNERSHIP OF FIBER OPTIC CABLE

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 753 days.

(21) Appl. No.: 10/170,671

(22) Filed: Jun. 12, 2002

(51) Int. Cl.
*H04B 10/08* (2006.01)
*H04B 17/00* (2006.01)

(52) U.S. Cl. ............................. 398/28; 398/31; 398/16
(58) Field of Classification Search ................. 398/10, 398/13, 15, 16, 20, 21, 28, 31
See application file for complete search history.

(56) References Cited

U.S. PATENT DOCUMENTS

| 4,708,471 A | 11/1987 | Beckmann et al. |
| 4,928,232 A | 5/1990 | Gentile |
| 5,452,071 A | 9/1995 | Takeuchi |
| 5,534,994 A | 7/1996 | Hanson et al. |
| 5,777,727 A | 7/1998 | Sato et al. |
| 5,926,263 A | 7/1999 | Lynch et al. |
| 6,301,036 B1 | 10/2001 | Spencer |
| 6,381,011 B1 | 4/2002 | Nickelsberg et al. |

OTHER PUBLICATIONS

"Maintenance method using 1650-nm wavelength band for optical fiber cable networks"; Nakao et al.; Lightwave Technology, Journal of, vol. 19, Issue 10, Oct. 2001; pp. 1513-1520.*
New England Telephone and Telegraph Company et al., http://www.state.vt.us/psb/sgat/sec1-3.pdf.*

* cited by examiner

*Primary Examiner*—Jason Chan
*Assistant Examiner*—Nathan Curs

(57) ABSTRACT

A passive optical arrangement for indicating the presence of a change in ownership along a fiber optic cable span uses an attenuation unit at a splice location that will severely attenuate an optical signal propagating along the span at a predetermined "marker" wavelength. Particularly well-suited in combination with determining the physical location of a fault along a fiber optic cable, the arrangement allows a technician to use an OTDR at the marker wavelength to determine both the physical location of the fault as well as the physical location of a change in ownership (if any) between the technician and the fault location, since the presence of the attenuation unit will register as a large step-wise change in signal propagation.

4 Claims, 2 Drawing Sheets

10

OPTOELECTRONIC MARKER FOR DETERMINING OWNERSHIP OF FIBER OPTIC CABLE

TECHNICAL FIELD

The present invention relates to the field of fiber optic cable installation and repair and, more particularly, to an optoelectronic arrangement for determining the ownership of a particular span of cable.

BACKGROUND OF THE INVENTION

Various telecommunications and broadcast communication companies have installed thousands of miles of fiber optic cable. In order for the complete communication system to function properly, the cables belonging to the different companies are necessarily spliced together at locations where the communication signals are passed from own company's responsibility to another. As these fiber cables are damaged by acts of God, such as lightning, or by contractors as they excavate around the cable, it is necessary to locate the precise area of the damaged cable. Various techniques known in the art, for example, Optical Time Domain Reflectivity (OTDR), may be used to determine the precise geographic location of the fault. An optical time domain reflectometer is an optoelectronic instrument that characterizes an optical fiber by injecting a series of optical pulses into the fiber under test, extracting light that is backscattered and reflected back, measuring and integrating the intensity of the return pulses as a function of time, and plotting the integration as a function of fiber length. From this plot, the fiber's length, overall attenuation (including splice and connector losses), as well as the location of any faults or breaks can be estimated.

Backscattered light, commonly referred to as Rayleigh scattering, is typically weak, and is due to refractive index fluctuations and inhomogeneities in the fiber core. The strength of the backscattered signal is primarily dependent upon the peak power and width of the test pulse. The backscattered signal may be used to detect faults such as micro-bends or splice losses, as well as to measure overall attenuation.

Reflective signals, commonly referred to as Fresnel reflections, are somewhat stronger and are caused by discontinuities in the fiber. The strength of the reflected signal is primarily dependent upon the peak power of the test pulse. Reflective signals may be used to determine the overall length of the fiber line, and to detect breaks in the fiber reflective connectors and splices of fiber having different indices of refraction.

While conventional OTDRs have proven extremely useful in determining the physical location of a fiber fault, there is no way to determine, from that measurement, the "owner" of the cable at the fault location. As more and more communication networks control different geographic areas of an interconnected fiber network, it will become increasingly difficult to assign the various cables with the various network providers.

Thus, a need remains in the art for an arrangement that is capable of defining both the location of a fiber optic cable fault as well as the "owner" of the fiber at the location of the fault.

SUMMARY OF THE INVENTION

The need remaining in the prior art is addressed by the present invention, which relates to the field of fiber optic cable installations and, more particularly, to an optoelectronic arrangement for determining the ownership of a particular span of cable.

In accordance with the present invention, a "marker" in the form of a unit that creates optical loss at a predetermined wavelength is inserted at a splice where a fiber cable from one company joins the fiber cable from another company. A conventional fiber testing device, such as an optical time domain reflectometer (OTDR), can then be used to determine the precise location of the junction between the difference companies' cables. Therefore, if a fault is determined to exist along a particular fiber cable route, an OTDR operating at the "marker wavelength" will be able to determine both the physical location of the "fault", as in a conventional OTDR system, as well as the location where the cable changes ownership from one company to another. Thus, depending on the location of the fault with respect to the cable ownership marker, the proper technicians can be called to come in and repair the cable fault.

In a preferred embodiment of the present invention the marker comprises a unit that will significantly attenuate the signal propagating at the predetermined test wavelength. Particularly, a unit that attenuates a wavelength well above the signal band used for conventional communication systems is preferred. For example, in systems where the highest transmission wavelength is 1550 nm, a unit that introduces microbending losses at a predetermined wavelength over 1600 nm may be used without introducing unwanted attenuation at any of the signal wavelengths.

The use of the company "marker" of the present invention with cable fault location is considered to be only one particular use of such a marker. In cases where additional fiber routes are being added, dropped, moved, etc. there may also be an interest in knowing the ownership of the various cables. The marker of the present invention is indeed suitable for use in any situation where it is desirous to determine the ownership of a particular span of cable.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
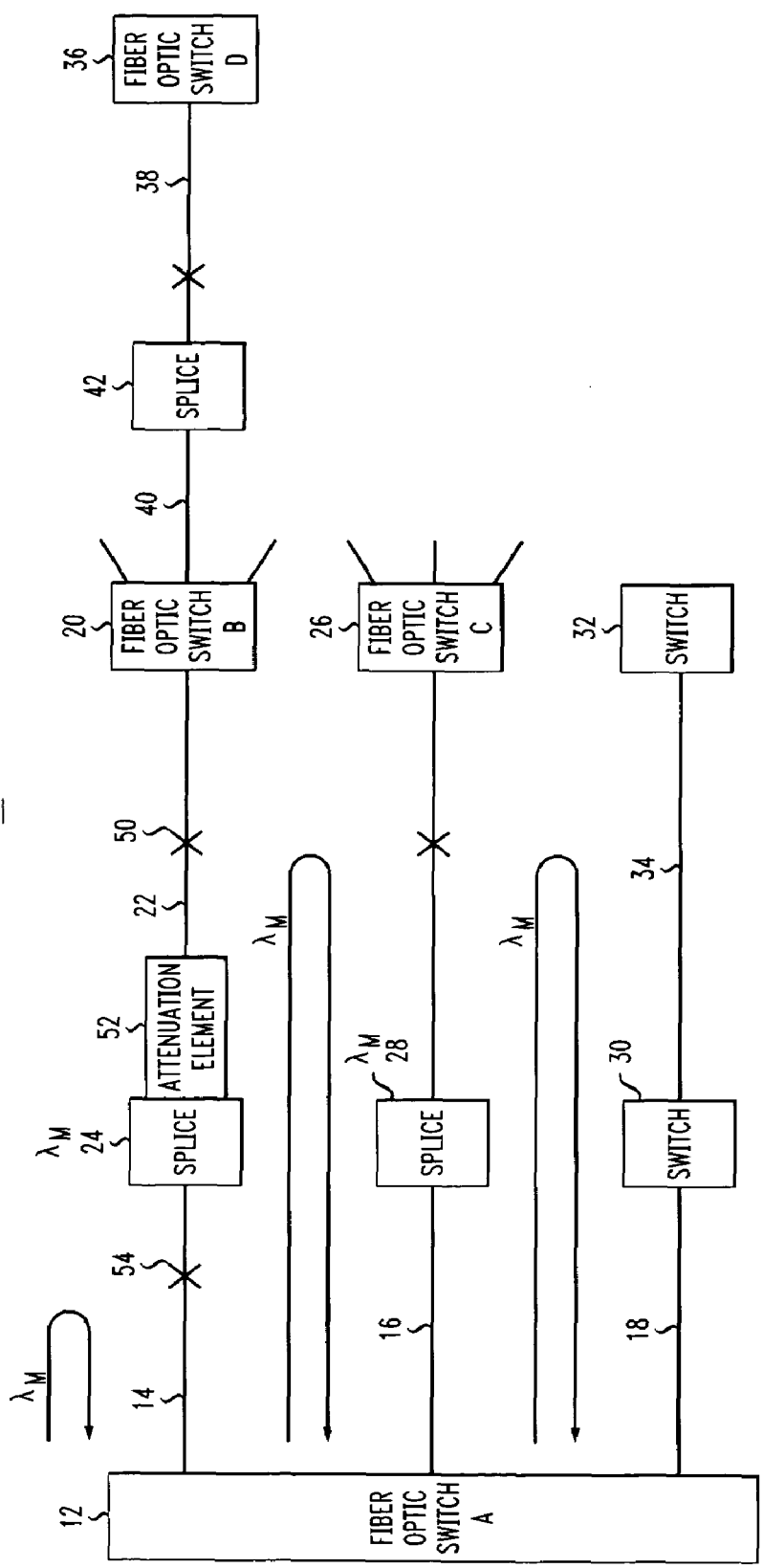
FIG. 1 illustrates an exemplary fiber optic cable network including spans of cable "owned" by different companies, the network also illustrating the location of various faults within the network.

FIG. 1 illustrates, in simplified form, an exemplary optical communications network 10 that can implement the optoelectronic company marker of the present invention. In this particular arrangement, a set of four separate companies, denoted A, B, C and D are designated as "owning" various spans within fiber optic network 10. Referring to FIG. 1, company A is associated with a first fiber optic switch 12 and is defined as owning a set of cables 14, 16 and 18 that are coupled to first fiber optic switch 12. Company B is illustrated as associated with a second fiber optic switch 20, where a fiber cable 22 is coupled to switch 20 and is spliced to cable 14 of Company A at a first splice location 24. In a similar fashion, company C is associated with a third fiber optic switch 26, where a cable 28 from switch 26 is spliced to cable 16 from Company A at a second splice location 28. Switches 30 and 32 are also controlled by company A, where cable 18 is used to interconnection switch 12 with switch 30. An additional fiber optic cable span 34 is then used to provide communication between switch 30 and switch 32. Company D is illustrated as having a switch 36 located beyond switch 20 belonging to company B, where company D owns a fiber optic span 38 that is spliced to a fiber cable 40 owned by company B within a third splice location 42.

As mentioned above, there are many occasions (such as installation of new routes, removing of certain routes, etc) where it is important to determine who owns a particular span of fiber. One network condition where ownership determination is particularly important is when a "fault" has been detected along a certain span of fiber optic cable. In the network as illustrated in FIG. 1, various fault locations have been indicated by the use of an "X" along the cable path. In accordance with the teachings of the present invention, splice locations 24 and 28 have been modified to introduce attenuation at a predetermined "marker" wavelength, denoted $\lambda_M$, which is significantly different from any wavelength used for signal transmission in the optical communication system. For example, wavelengths over 1600 nm may be used (an embodiment using, in particular, 1625 nm has been found to work well without introducing attenuation at any of the signal wavelengths). Referring to FIG. 1, therefore, it is presumed that a fault at location 50 has occurred. Initially, a technician from Company A will only know that a fault has occurred somewhere along cables 14, 22 between switches 12 and 20. A technician, using a conventional OTDR, can launch a test signal at wavelength $\lambda_M$ along the span of cables 14, 22 to determine, in a conventional manner, the physical location of the fault. In accordance with the present invention, the OTDR will also record significant attenuation of the test signal at the position of splice location 24, due to the use of an attenuation element 52 with splice location 24. Therefore, since the technician has received an indication of attenuation, the technician knows that fault 50 occurred along span 22, which is owned or controlled by another communication company.

In contrast, presume that a fault occurs at location 54, as indicated in FIG. 1. As before, a technician from Company A uses an OTDR to send a test signal at wavelength $\lambda_M$ along fiber cable span 14. The reflected signal back to the OTDR will contain information regarding the location of fault 54, but will not include any significant attenuation, since marker 52 is located beyond fault 54. Therefore, the technician knows that this particular fault is located along his company's span and he can therefore begin the repair of the faulted cable.

Figure 2:
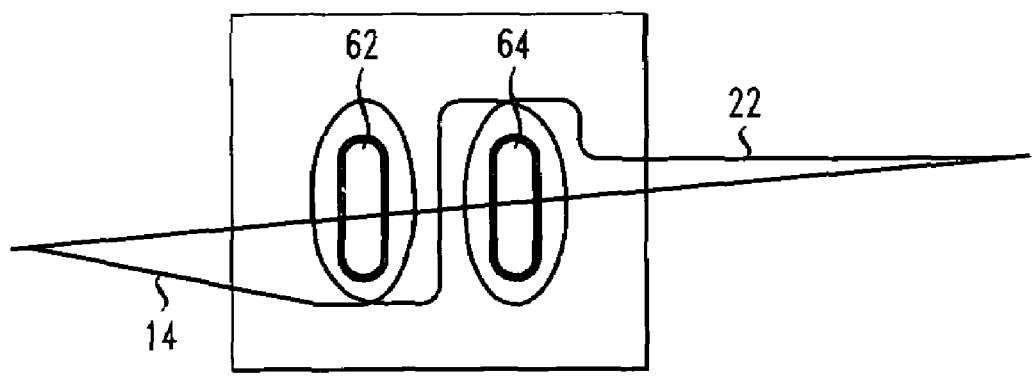
FIG. 2 illustrates an exemplary passive attenuator that may be used as a marker and included with an inter-company splice location.

An exemplary passive attenuation marker 60 that can be used to denote the change in ownership of a fiber cable span is illustrated in FIG. 2. In this particular example, marker 60 comprises a pair of posts 62 and 64 that are used to wrap the spliced area between cables 14 and 22. By controlling the size and separation between posts 62 and 64, microbending loss at a predetermined marker wavelength $\lambda_M$ can be introduced into the spliced region between cables 14 and 22. Advantageously, introducing loss at a relatively high wavelength (e.g., over 1600 nm, preferably approximately 1625 nm) will not affect the performance of the cable at the other, lower wavelengths (e.g., 1500-1550 nm) used for transmission in the communication system. It is to be understood that the microbending loss arrangement of device 60 is exemplary only and any other device that introduces attenuation at a particular maker wavelength may be used in accordance with the teachings of the present invention.

Figure 3:
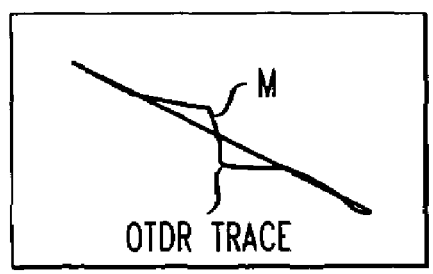
FIG. 3 is an exemplary trace from an OTDR used to locate an optical fault, the trace further indicating the location of a company marker in accordance with the present invention.

An exemplary OTDR trace illustrating the presence of an attenuation at the marker wavelength is illustrated in FIG. 3. The step-wise decrease in the signal, denoted by the letter "M" in the trace is indicative of the presence of attenuation at the marker wavelength. Thus, when this step-wise decrease occurs it is associated with a change in ownership from one portion of a fiber cable span to another.

As this invention may be embodied in several forms without departing from the spirit of essential characteristics thereof, the present embodiment is therefore illustrative and not restrictive, since the scope of the invention is defined by the appended claims rather than by the description preceding the claims, and all changes that fall within metes and bounds of the claims, or equivalence of such metes and bounds are therefore intended to be embraced by the claims.

What is claimed is:

1. A method of determining the physical location of the change in ownership from a first fiber optic cable associated with a first owner to a second fiber optic cable associated with a second owner along a continuous fiber optic cable span, the method comprising the steps of:
   inserting a passive attenuation element at a splice location between the first fiber optic cable and the second fiber optic cable, said passive attenuation element for generating significant optical signal attenuation at a predetermined marker wavelength associated only with the first owner and greater than any wavelength used for optical communication, the presence of the attenuation indicating a change in ownership from the first owner to the second owner; and
   launching a test signal at the predetermined marker wavelength from a location along said first fiber optic cable; and
   determining if an attenuation is present in a reflected signal, the presence of attenuation indicating a change in ownership along the tested portion of the fiber optic cable span and the absence of attenuation indicating no change in ownership along the tested portion of the fiber optic cable span.

2. The method as in claim 1 wherein a fault has been determined along the fiber optic cable span and an OTDR is used to launch the test signal at the marker wavelength to determine both the physical location of the fault and the physical location of the change of ownership.

3. The method as defined in claim 1 wherein optical communication occurs in the wavelength range of 1500 to 1550 nm, and a predetermined marker wavelength greater than 1600 nm is used.

4. The method as defined by claim 1 wherein attenuation at the predetermined marker wavelength is accomplished by bending the fiber optic cable span to introduce microbending loss at the splice location, the radius of curvature of the microbending loss controlled to introduce attenuation at the predetermined marker wavelength.

* * * * *